(12) United States Patent
Blaesing

(10) Patent No.: US 9,168,928 B2
(45) Date of Patent: Oct. 27, 2015

(54) OPERATING SYSTEM FOR A MOTOR VEHICLE

(71) Applicant: Leopold Kostal GmbH & Co. KG, Luedenscheid (DE)

(72) Inventor: Frank Blaesing, Werl (DE)

(73) Assignee: Leopald Kostal GmbH & Co. KG, Luedenscheid (DE)

( * ) Notice: Subject to any disclaimer, the term of this patent is extended or adjusted under 35 U.S.C. 154(b) by 0 days.

(21) Appl. No.: 14/576,741

(22) Filed: Dec. 19, 2014

(65) Prior Publication Data

US 2015/0105939 A1    Apr. 16, 2015

Related U.S. Application Data

(63) Continuation of application No. PCT/EP2013/063085, filed on Jun. 24, 2013.

(30) Foreign Application Priority Data

Jun. 26, 2012    (DE) .......................... 10 2012 012 697

(51) Int. Cl.
*B60W 50/10*    (2012.01)
*G06F 3/01*    (2006.01)

(52) U.S. Cl.
CPC ............... *B60W 50/10* (2013.01); *G06F 3/017* (2013.01); *B60K 2350/1052* (2013.01)

(58) Field of Classification Search
CPC . G06F 3/017; B60W 50/10; B60K 2350/1052
See application file for complete search history.

(56) References Cited

U.S. PATENT DOCUMENTS

| 7,437,488 | B2 * | 10/2008 | Ito et al. ........................... 710/15 |
| 2005/0197843 | A1 | 9/2005 | Faisman et al. |
| 2009/0102788 | A1 | 4/2009 | Nishida et al. |
| 2009/0278915 | A1 * | 11/2009 | Kramer et al. .................. 348/48 |
| 2012/0105613 | A1 | 5/2012 | Weng et al. |
| 2013/0151031 | A1 * | 6/2013 | Ricci ................................ 701/1 |
| 2013/0155237 | A1 * | 6/2013 | Paek et al. ............. G06F 1/1632 348/148 |
| 2013/0187889 | A1 * | 7/2013 | Pandher et al. ............... 345/174 |
| 2014/0089864 | A1 * | 3/2014 | Cheng et al. .................. 715/863 |
| 2014/0316763 | A1 * | 10/2014 | Tardif ............................... 704/3 |

FOREIGN PATENT DOCUMENTS

DE    102007040288 A1    2/2009

OTHER PUBLICATIONS

European Patent Office, International Search Report for International Application No. PCT/EP2013/063085 mailed Sep. 20, 2013.
The International Bureau of WIPO, International Preliminary Report on Patentability for corresponding PCT/EP2013/063085 mailed Dec. 31, 2014.

* cited by examiner

*Primary Examiner* — Rodney Butler
(74) *Attorney, Agent, or Firm* — Brooks Kushman P.C.

(57) ABSTRACT

An operating system for a motor vehicle, having a first operating unit for detecting user gestures, at least one second operating unit for detecting user inputs, and an evaluation unit which assigns the user gestures and user inputs detected by the operating units to operating functions. The evaluation unit checks whether a user gesture and a user input have been detected at the same time within the same time window and within the same spatial area. The evaluation unit modifies or suppresses the operating function assigned to the user gesture in the event of a positive result of the check.

16 Claims, 1 Drawing Sheet

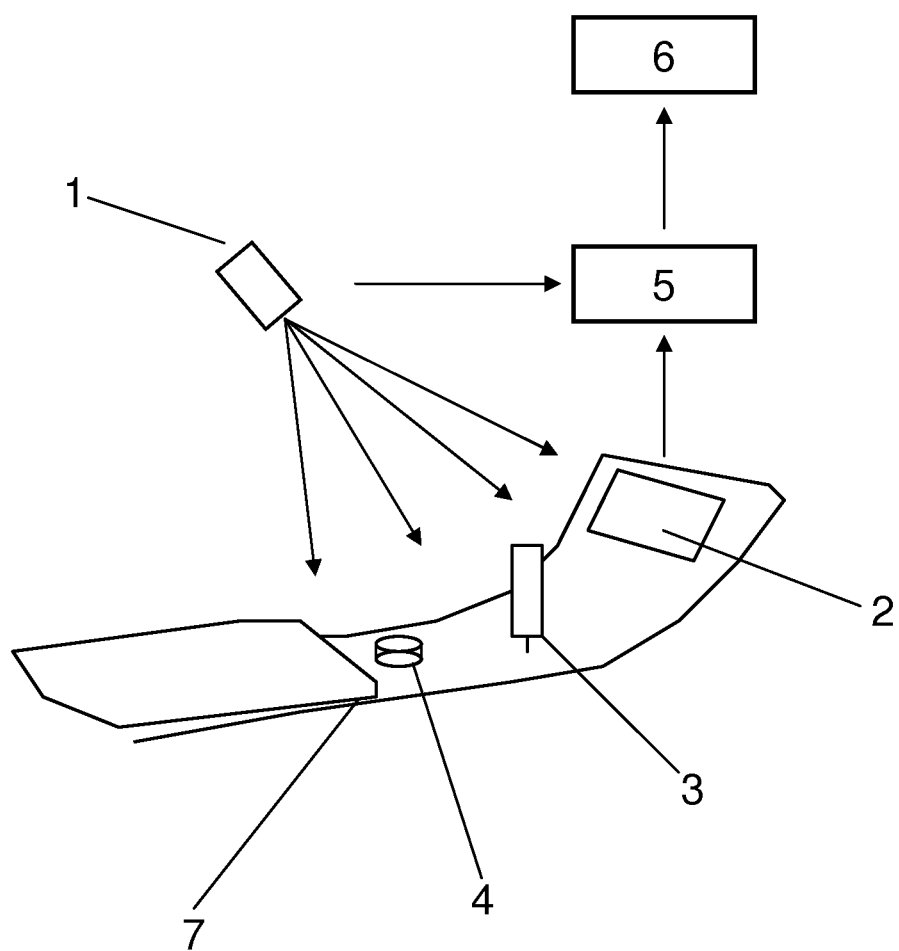

OPERATING SYSTEM FOR A MOTOR VEHICLE

CROSS-REFERENCE TO RELATED APPLICATIONS

This application is a continuation of International Application No. PCT/EP2013/063085, published in German, with an International filing date of Jun. 24, 2013, which claims priority to DE 10 2012 012 697.2, filed Jun. 26, 2012, the disclosures of which are hereby incorporated in their entirety by reference herein.

TECHNICAL FIELD

The invention relates to an operating system for a motor vehicle having a first operating unit for detecting user gestures, at least one second operating unit for detecting user inputs, and an evaluation unit that assigns the operating functions from the user gestures and user inputs that are detected by the operating units.

BACKGROUND

The possibility of using non-contacting operating elements based on gesture recognition is increasingly feasible through the implementation of optical sensors, and particularly camera systems, in motor vehicles. In hand or finger gesture recognition systems, the problem of false recognition of gestures arises, which is caused by the actuation of conventional operating elements that are located in the detection region of a gesture sensor, while e.g. motions for actuating switches or shift levers are detected and interpreted by the gesture recognition system as user inputs. The operating functions triggered in this manner can lead to undesirable or even dangerous situations.

In order to avoid this, it is known how to determine spatial limits for the gesture recognition system within which gestures should be recognized, and to avoid placement of additional operating elements in such a region. However, the problem also exists that for so-called multimodal operating concepts, gestures must also be recognized in places where other operating elements are located (such as e.g. a wiping gesture while operating a rotating pressure actuator.

Such an operating system with a multimodal operating concept is described in the German laid open patent DE 10 2007 040 A1. This document relates to a plurality of simultaneous operating actions that individually have no significance or one specific significance in combination with an additional operating action to assign a combined additional meaning Such precisely defined operating combinations are normally not critical.

It can be a problem, however, if the motion for a conventional operating action, such as for the actuation of a switch, is erroneously interpreted within the framework of a gesture recognition system as an operating gesture.

SUMMARY

The objective is to create an operating system that avoids hazards that result from such errors with high level of safety.

This problem is solved according to the invention in that the evaluation unit checks whether a user gesture and a user input have been detected within the same time window and in the same spatial region, and that the evaluation unit modifies or suppresses the operating function that is assigned to the user gesture if the test result is positive.

The invention is based on the concept that if, at the time of recognizing a gesture, an input occurs simultaneously through another operating element within the detection region of the gesture sensor, and the position of the recognized gesture and the position of the other operating element agree within a range of spatial tolerance, it is highly probable that the detected gesture does not relate to a motion intended as an operating gesture. The execution of an undesired operating function is thereby prevented since under these circumstances the operating function assigned to the gesture is suppressed or at least modified.

Operating functions for gestures that are predefined in the evaluation unit as being expected to occur together with specific inputs can be excepted from the modification or suppression process.

BRIEF DESCRIPTION OF THE DRAWINGS

The sole Figure outlines the principle layout of an operating system according to the invention.

DETAILED DESCRIPTION

In the following section the invention will be described in greater detail with the aid of the drawings. The single figure outlines the principle layout of an operating system according to the invention. The view onto a center console 7 of a motor vehicle is shown schematically. A first operating unit 1 is located above center console 7, which can detect hand and finger gestures. First operating unit 1 has a capacitive or preferentially an optical sensor for gesture recognition that detects the movements of the driver and possibly the passenger in a non-contacting manner.

In a preferred embodiment, first operating unit 1 is implemented as a camera that views center console 7. Camera 1 can be designed especially advantageously as a stereo camera, which can detect objects spatially. A time-of-flight camera can be used most advantageously that enables direct interval measurements, or even the use of a thermal imaging camera, which can sharply resolve the unclothed body parts of persons from objects in the surroundings based on their characteristic temperature.

Camera 1 passes its output signals to an evaluation unit 5, which recognizes motions from them and identifies the operating gestures that are carried out from the sequence of motions, and assigns the identified operating functions to be triggered by the operating gestures. Evaluation unit 5 can thereupon control motor vehicle components 6 according to the operating functions that are selected by the identified operating gestures.

Evaluation unit 5 can either be implemented through a central electronics system of the motor vehicle, or by a special electronics component assigned to first operating unit 1, which can communicate with additional electronic components (not shown) of the motor vehicle by data exchange. Only the first of these possibilities is shown in the figure, without limiting the generality of the concept.

A plurality of second operating units 2, 3, 4 can be seen in center console 7, including especially a touchpad 2, a gear selector lever 3, and a rotary actuator 4. The common feature of these second operating units 2, 3, 4 is that they require a person to grip them to be actuated.

The problem with this is that the motion required of the driver or passenger is also detected by first operating unit 1. Depending on the type of motion carried out, this can be interpreted as a user gesture by evaluation unit 5 or even misinterpreted. If evaluation unit 5 now triggers the allegedly intended operating function based on the gesture that is recognized, the possibility cannot be excluded that a dangerous situation can arise. Thus, for example, an unexpected executed operating function can irritate the driver and thereby trigger an inappropriate reaction on the part of the driver.

Evaluation unit 5 therefore checks the first operating unit 1 and one of the second operating units 2, 3, 4 to see if an operating gesture has been detected in the spatial region in which the second operating unit 2, 3, 4 that transmitted the detection signal is located. Since the two detected events usually do not coincide exactly with respect to their spatial and time coordinates, evaluation unit 5 takes into consideration a time window and a spatial range as the tolerance range.

For this reason it can be advantageous to provide that evaluation unit 5 intermediately stores detected signals from first operating unit 1 before processing for a prescribed time interval, so that a delayed detection of a user input by a second operating unit 2, 3, 4 can influence the subsequent processing of the recognized user gesture.

If evaluation unit 5 determines that detection signals are coincident in space and time from the first and a second operating unit 1, 2, 3, 4, it then modifies the application of the detected signals with respect to conventional usage, so that a safe state is achieved at all times. In case of doubt, evaluation unit 5 discards completely the signal representing the detected operating gesture, so that the corresponding operating function is simply suppressed.

This approach is based on the assumption that the operating functions that can be triggered by gesture control have a lower priority than the operating functions that can be controlled by the actuation of the second operating element. Consequently, in the case of an imprecisely defined situation, the implementation of a gesture controlled operating function is relinquished in favor of an increased level of safety.

REFERENCE SYMBOLS

1 Camera (first operating unit)
2 Touchpad (second operating unit)
3 Gear selector lever (second operating unit)
4 Rotational adjuster (second operating unit)
5 Evaluation Unit
6 Components
7 Center console

What is claimed is:

1. An operating system for a motor vehicle comprising:
   a first operating unit for detecting user gestures in a non-contacting manner without user contact of the first operating unit,
   at least a second operating unit for detecting user inputs in response to being actuated by user contact, each second operating unit being arranged in a respective spatial region, and
   an evaluation unit that assigns operating functions from the user gestures that are detected by the first operating unit and assigns different operating functions from the user inputs that are detected by each second operating unit, characterized in that
   the evaluation unit checks to see whether a user gesture and a user input have been detected simultaneously within the same time window and whether the user gesture has been detected in the same spatial region of the second operating unit detecting the user input, and
   the evaluation unit modifies or suppresses the operating function that is assigned to the user gesture and maintains the operating function that is assigned to the user input in case of a positive result of the test.

2. The operating system according to claim 1, characterized in that the evaluation unit has an exception list of known combinations of user gestures and user inputs, for which the evaluation unit neither modifies nor suppresses the operating function that is assigned to the user gesture when detected together.

3. The operating system according to claim 1, characterized in that the evaluation unit triggers operating functions based on recognized operating gestures only after the passage of a predetermined time interval.

4. The operating system according to claim 1, characterized in that the first operating unit forms a sensor for recognizing hand gestures.

5. The operating system according to claim 1, characterized in that the first operating unit forms a sensor for recognizing finger gestures.

6. The operating system according to claim 1, characterized in that the first operating unit has capacitive sensors.

7. The operating system according to claim 1, characterized in that the first operating unit has optical sensors.

8. The operating system according to claim 1, characterized in that the first operating unit is located in a roof region or in a center console of a motor vehicle.

9. The operating system according to claim 1, characterized in that a second operating unit is implemented as a switch, rotational switch, or a rotational adjuster.

10. The operating system according to claim 1, characterized in that a second operating unit is a touchpad.

11. The operating system according to claim 1, characterized in that a second operating unit is a gear selector lever.

12. The operating system according to claim 1, characterized in that the evaluation unit consists of a plurality of electronic units associated with the operating units, which communicate among one another.

13. The operating system according to claim 7, characterized in that the first operating unit has an image acquisition sensor.

14. The operating system according to claim 13, characterized in that the image acquisition sensor component is a stereo camera, a time-of-flight camera, or a thermal imaging camera.

15. An operating system comprising:
    a first operating unit for detecting user gestures in a non-contacting manner without user contact of the first operating unit,
    a second operating unit for detecting user inputs in response to being actuated by user contact, the second operating unit being arranged in a spatial region,
    an evaluation unit that assigns an operating function from a user gesture that is detected by the first operating unit and assigns a different operating function from a user input that is detected by the second operating unit,
    wherein the evaluation unit checks to see whether the user gesture and the user input have been detected simultaneously within the same time window and whether the user gesture has been detected within the same spatial region of the second operating unit, and
    wherein the evaluation unit modifies or suppresses the operating function that is assigned to the user gesture and maintains the operating function that is assigned to the user input in case of a positive result of the test.

16. The operating system according to claim 15 wherein:
    the first operating unit is one of a capacitive sensor, an optical sensor, and an image acquisition sensor; and
    the second operating unit is one of a switch, a rotational switch, a rotational adjuster, and a touchpad.

* * * * *